United States Patent
Melander et al.

(10) Patent No.: US 11,632,297 B2
(45) Date of Patent: *Apr. 18, 2023

(54) APPARATUSES AND METHODS RELATED TO CONNECTING TUNNELS THROUGH A VIRTUAL SWITCH

(71) Applicant: TELEFONAKTIEBOLAGET LM ERICSSON (PUBL), Stockholm (SE)

(72) Inventors: Bob Melander, Sigtuna (SE); Enrique Eduardo Fernandez Casado, Stockholm (SE); Hareesh Puthalath, Solna (SE); Azimeh Sefidcon, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 42 days.

This patent is subject to a terminal disclaimer.

(21) Appl. No.: 17/339,636

(22) Filed: Jun. 4, 2021

(65) Prior Publication Data

US 2021/0297312 A1 Sep. 23, 2021

Related U.S. Application Data

(63) Continuation of application No. 14/410,292, filed as application No. PCT/IB2012/053612 on Jul. 13, 2012, now Pat. No. 11,057,268.

(51) Int. Cl.
*H04L 41/0806* (2022.01)
*H04L 12/46* (2006.01)
(Continued)

(52) U.S. Cl.
CPC ...... *H04L 41/0806* (2013.01); *G06F 9/45558* (2013.01); *H04L 12/4633* (2013.01);
(Continued)

(58) Field of Classification Search
CPC ............. H04L 41/0806; H04L 12/4633; H04L 47/825; H04L 49/70; H04L 47/824;
(Continued)

(56) References Cited

U.S. PATENT DOCUMENTS

| 8,804,494 B1 | 8/2014 | Uberoy |
| 8,824,274 B1 | 9/2014 | Medved et al. |

(Continued)

FOREIGN PATENT DOCUMENTS

EP 1883195 A1 1/2008

OTHER PUBLICATIONS

Arati Baliga et al., "Virtual Private Mobile Network Towards Mobility as a Service", Jun. 28, 2011, paper, 5 pages.*
(Continued)

*Primary Examiner* — Kwang B Yao
*Assistant Examiner* — Syed M Bokhari
(74) *Attorney, Agent, or Firm* — Patent Portfolio Builders PLLC

(57) ABSTRACT

Apparatuses and methods enable connecting tunnels channeling data flow from a user terminal and to a mobile network through a virtual switch in a network device which is configured to provide a service by processing data in the data flow. A method performed by a device having one or more processors includes establishing a first tunnel between the device and a node of the mobile network, and a second tunnel between the device and another network device of the mobile network, the first tunnel and the second tunnel operating according to Internet protocols. The method further includes connecting the first tunnel to the second tunnel using a virtual switch running on the device, and connecting a virtual machine running on the device to the virtual switch, the virtual machine being configured to provide a service by processing data in the data flow.

7 Claims, 4 Drawing Sheets

(51) Int. Cl.

| | | |
|---|---|---|
| *H04L 47/70* | (2022.01) | |
| *H04W 76/12* | (2018.01) | |
| *G06F 9/455* | (2018.01) | |
| *H04L 49/00* | (2022.01) | |
| *H04W 28/10* | (2009.01) | |

(52) U.S. Cl.
CPC ............ *H04L 47/825* (2013.01); *H04L 49/70* (2013.01); *H04W 28/10* (2013.01); *H04W 76/12* (2018.02); *G06F 2009/45595* (2013.01); *H04L 47/824* (2013.01)

(58) Field of Classification Search
CPC ... H04W 28/10; H04W 76/12; G06F 9/45558; G06F 2009/45595
USPC .......................................................... 370/254
See application file for complete search history.

(56) References Cited

U.S. PATENT DOCUMENTS

| | | |
|---|---|---|
| 2009/0131053 A1 | 5/2009 | Sachs et al. |
| 2013/0044613 A1 | 2/2013 | Edara et al. |
| 2013/0142166 A1 | 6/2013 | Bogineni et al. |
| 2013/0294240 A1 | 11/2013 | Suni |

OTHER PUBLICATIONS

Arati Baliga et al. "Virtual Private Mobile Network towards mobility as a service", Jun. 2011, Paper, 5 pages.

Baliga, Arati et al., "VPMN—Virtual Private Mobile Network Towards Mobility-as-a-Service," MCS '11, Jun. 28, 2011, pp. 7-11, XP55035013, Bethesda, Maryland, USA, DOI: 10.1145/1999732. 1999735; ISBN: 978-1-45-030738-3.

Global System for Mobile Communications (GSM), 3rd Generation Partnership Project (3GPP); "3rd Generation Partnership Project; Technical Specification Group Core Network and Terminals; General Packet Radio Service (GPRS); GPRS Tunnelling Protocol (GTP) across the Gn and Gp interface (Release 8)"; 3 Gpp TS 29.060 V8.5.0 (Sep. 2008) Technical Specification; Sep. 2008; pp. 1-146.

Global System for Mobile Communications (GSM). 3rd Generation Partnership Project (3GPP); "3rd Generation Partnership Project; Technical Specification Group Services and System Aspects; General Packet Radio Service (GPRS); Service description; Stage 2 (Release 8)"; 3 GPP TS 23.060 V8.2.0 (Sep. 2008) Technical Specification; Sep. 2008; pp. 1-267.

International Search Report issued in corresponding International application No. PCT/IB2012/053612, dated Mar. 11, 2013.

Written Opinion of the International Searching Authority issued in International application No. PCT/IB2012/053612, dated Mar. 11, 2013.

* cited by examiner

APPARATUSES AND METHODS RELATED TO CONNECTING TUNNELS THROUGH A VIRTUAL SWITCH

TECHNICAL FIELD

The present invention generally relates to apparatuses and methods for connecting tunnels to channel a data flow from a user terminal to a mobile network through a virtual switch in a network device including a virtual machine configured to provide a service by processing data in the data flow.

BACKGROUND

Cloud computing is a term used relative to providing computing and storage capacity to a community of end users. The main types of cloud computing are Infrastructure-as-a-service (IaaS), Platform-as-a-Service (PaaS) and Software-as-a-Service as the users "rent" servers, system software used by the rented servers and application software of databases, respectively, from the cloud providers. For new businesses requiring computational and storage resources with variable capacity, cloud computing is an attractive alternative to investing in hardware and software. These new businesses often deliver their services using mobile networks. Instead of owning the computational and storage resources, the businesses may "rent" these resources from the network operator. The popularity of this type of business model is expected to continue increasing.

The tunneling of IP packets is used to channel data from/to users of mobile networks (including cloud computing users), the mobility mechanism being dependent on tunneling. A General Packet Radio Service (GPRS) Tunneling Protocol (GTP) tunnel is typically established between the eNodeB and gateways or server nodes to successfully transmit packets between a User Equipment (UE, or user terminal) and other devices in the mobile networks. The transmitted user payload is encapsulated and de-encapsulated by adding and removing a GTP header.

In a 3G/LTE mobile network, the GTP tunnels carry UE's packets, between Gateway GPRS Service Nodes (GGSN), Service GPRS Serving Nodes (SGSN), S-GW or PDN-GW and Radio Network Controller (RNC) or eNodeB. Technical details regarding 3G/LTE mobile network 3GPP TS 23.060 v8.2.0 (2008-09) "3rd Generation Partnership Project; Technical Specification Group Services and System Aspects; General Packet Radio Service (GPRS), Service description" Stage 2 (Release 8), and 3GPP TS 29.060 v8.5.0 (2008-09) "3rd Generation Partnership Project; Technical Specification Group Core Network and Terminals; General Packet Radio Service (GPRS), GPRS Tunneling Protocol (GTP) across the Gn and Gp interface" (Release 8).

The server and network virtualizations are employed to achieve dynamicity and scalability in IaaS clouds. These virtualizations are in part achieved using hypervisors and virtual switches. A virtual switch is similar to a physical switch in function but is completely implemented in software executed in servers (or other computing devices).

The hardware used in cloud computing are typically housed in large data centers that often located at long distances from their users. These long distances translate into delays leading to latency, which can negatively impact user's experience or performance of application(s) deployed in the cloud.

Accordingly, it would be desirable to provide devices and methods that avoid the latency caused by the long distances between the cloud computing hardware and users thereof.

SUMMARY

An object of the invention is to avoid the delays caused by the long distances between the cloud computing hardware and the users. This object is achieved by deploying cloud virtual machines (VMs) in or nearby the RNC or eNodeB. The entire applications may run in these VMs, or, alternatively, the VMs may support functionality for the applications. In order to use such cloud VMs, the traffic in the GTP tunnels has to be redirected into and out from the VMs as part of the packets journey to/from the user terminal.

According to one exemplary embodiment, there is a method for interposing a computing unit between a network node and another network device in a mobile network. The method includes dispatching a virtual machine on the computing unit the virtual machine being configured to provide a service by processing data in a data flow from a user terminal to the other network device through the network node. The method further includes configuring a first GTP tunnel between the network node and the computing unit to receive the data flow via the first tunnel, and a second GTP tunnel between the computing unit and the other network device to forward the data flow. The method then includes configuring, on the computing unit, a virtual switch having a first port that is a terminal point for the first GTP tunnel and a second port that is a starting point for the second GTP tunnel to forward the data flow there-between, and to supply the data to the virtual machine.

According to one exemplary embodiment, there is a method performed by a device having one or more processors. The method includes establishing (A) a first tunnel between the device and a node of the mobile network to receive a data flow from a user terminal via the first tunnel, and (B) a second tunnel between the device and another network device of the mobile network to forward the data flow via the second tunnel, the first tunnel and the second tunnel operating according to Internet protocols. The method further includes connecting the first tunnel to the second tunnel using a virtual switch running on the device, and connecting a virtual machine running on the device to the virtual switch, the virtual machine being configured to provide a service by processing data in the data flow.

According to another exemplary embodiment there is a computing unit including at least one physical interface and a data processing unit. The at least one physical interface is configured to communicate with a node of a mobile network and another network device of the mobile network. The data processing unit includes one or more processors and is configured to establish (A) a first tunnel between the computing unit and the node of the mobile network to enable a data flow from a user terminal via the first tunnel, and (B) a second tunnel between the computing unit and the other network device to forward the data flow, the first tunnel and the second tunnel operating according to Internet protocols. The data processing unit is further configured to run executable codes corresponding to a virtual switch connecting the first tunnel to the second tunnel, and to run executable codes corresponding to a virtual machine connected to the virtual switch, the virtual machine being configured to provide a service to the user terminal by processing data in the data flow.

According to another exemplary embodiment, there is a computer readable medium non-transitory storing executable codes which, when executed on a computer having a mobile network interface and one or more processors make the computer perform a method for interposing a computing unit between a network node and another network device in a mobile network. The method includes establishing (A) a first tunnel between the device and a node of the mobile network to receive a data flow from a user terminal via the first tunnel, and (B) a second tunnel between the device and another network device of the mobile network to forward the data flow via the second tunnel, the first tunnel and the second tunnel operating according to Internet protocols. The method further includes connecting the first tunnel to the second tunnel using a virtual switch running on the device, and connecting a virtual machine running on the device to the virtual switch, the virtual machine being configured to provide a service by processing data in the data flow.

According to yet another exemplary embodiment, there is a device in a mobile network having a mobile network interface configured to enable the device to communicate to a computing unit, and a data processing unit configured to provide information to a switch controller for configuring a virtual switch running on the computing unit to operate as a GTP tunnel end point, and to redirect a network node and another network device that have initially been connected via a GTP tunnel, to connect via a first GTP tunnel and a second GTP tunnel to the computing unit, respectively. Here, the computing unit (A) receives a data flow from a user terminal via the first tunnel, forwards the data flow via the second tunnel, the first tunnel being connected to the second tunnel by the virtual switch, and (B) connects a virtual machine running on the computing unit to the virtual switch, the virtual machine being configured to provide a service by processing data in the data flow.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a packet data network capable to serve mobile user equipments (UEs) and to setup GTP tunnels. However, the embodiments to be discussed next are not limited to 3G/LTE systems but may be applied to other packet data networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
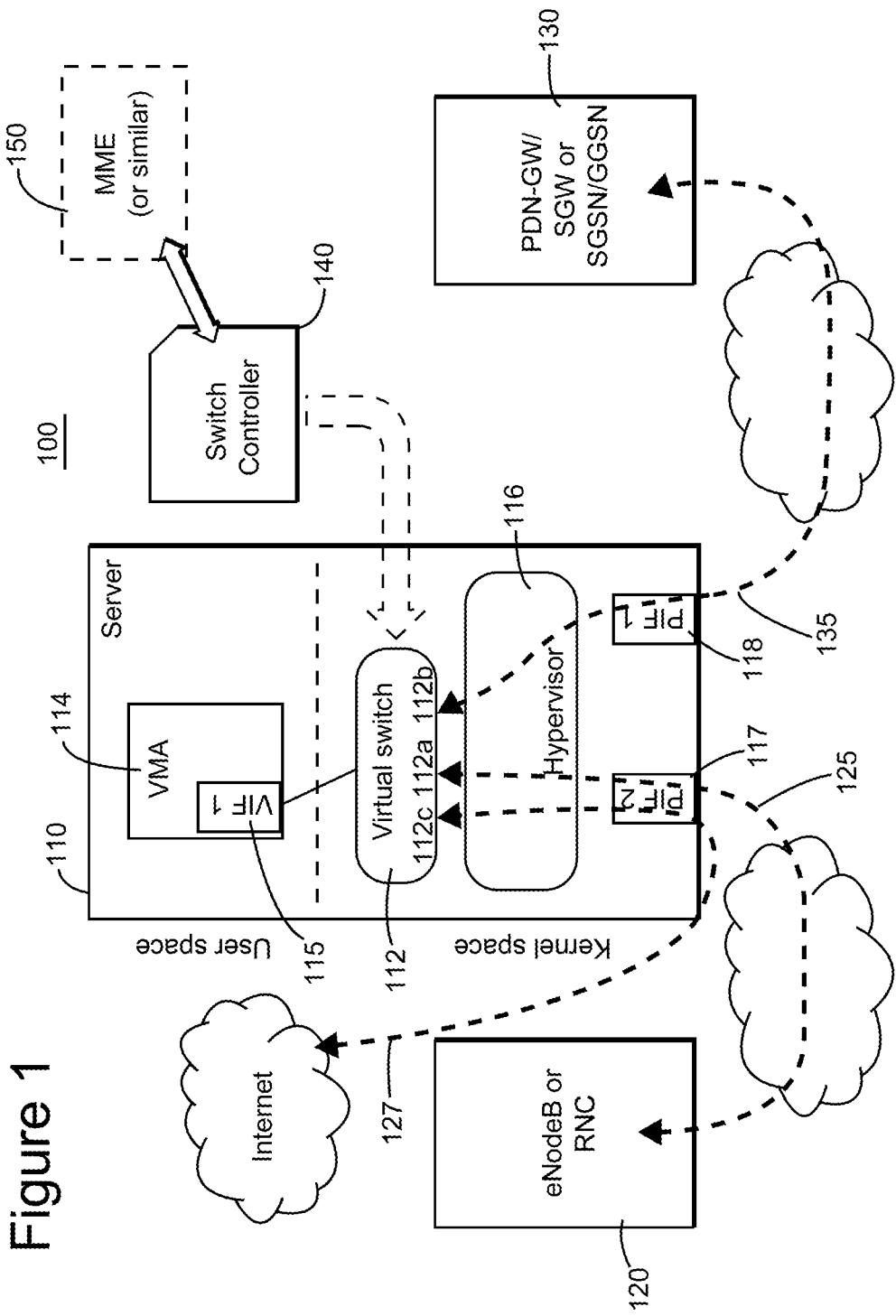
FIG. 1 is a schematic diagram of a system according to an exemplary embodiment.

FIG. 1 schematically illustrates a system 100, including a computing unit 110 according to an exemplary embodiment. The computing unit 110 is provided between a network node 120 and another network device 130 in a mobile network to allow running an application as a cloud computing service to be executed physically closer to the source of the data. The network node 120 may be the eNodeB serving the UE that is the source of the data or a Radio Network Controller (RNC) node. The other network device 130 may be a gateway (e.g., PDN-GW or SGW) or a service node (e.g., SGSN or GGSN). Although in FIG. 1, the computing unit 110 is illustrated as an entity separate from the node 120, in some embodiments, the computing unit may be included in the node 120 and at least it is located in the physical proximity of the node 120.

Conventionally, the computing unit 110 was absent and the data from the UE was transmitted via the network node 120 to the other network device via a single GTP tunnel.

Figure 2:
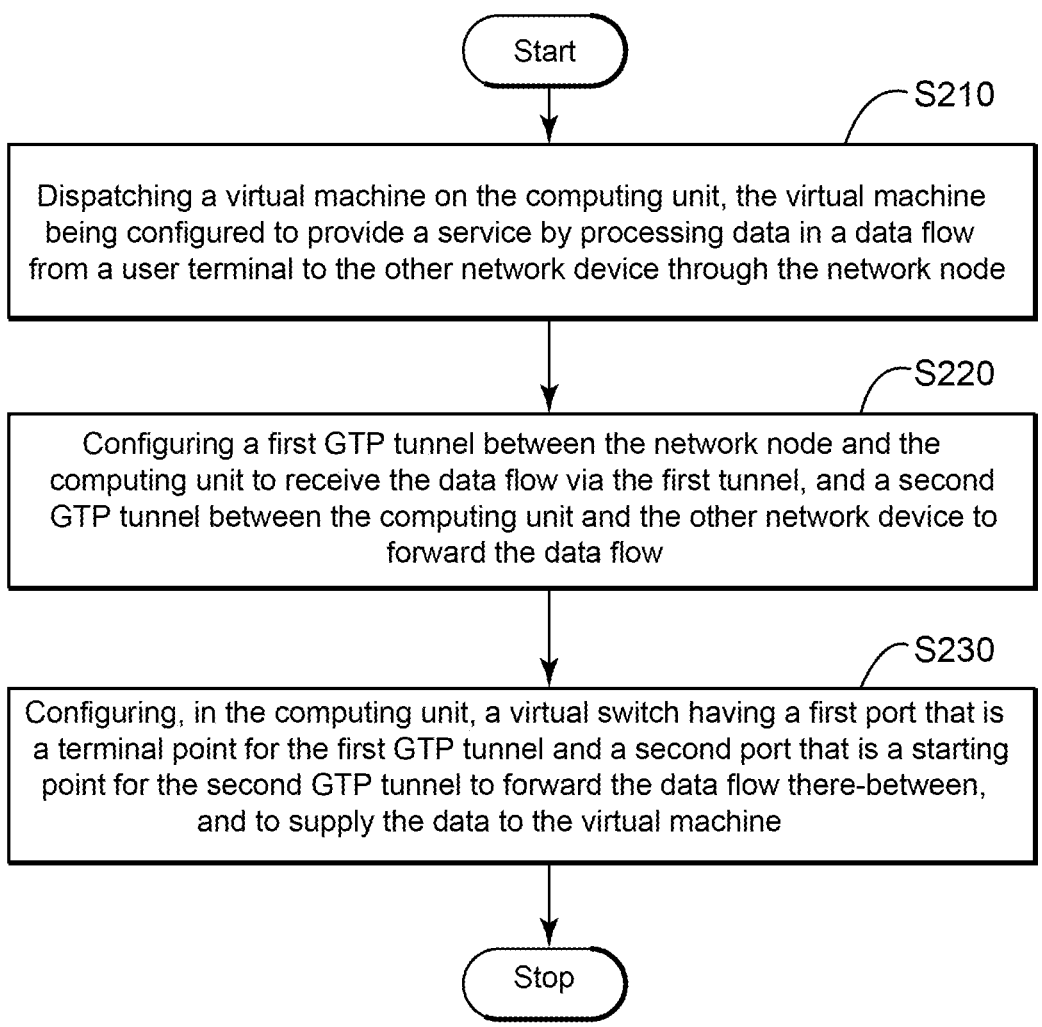
FIG. 2 is a flow diagram of a method according to another exemplary embodiment.

FIG. 2 is a flow diagram of a method 200 for interposing the computing unit (e.g., 110) between the network node (e.g., 120) and the other network device (e.g., 130) in a mobile network. The method 200 includes dispatching a virtual machine 114 on the computing unit 110, at S210. The virtual machine 114 is configured to provide a service by processing data in a data flow of packets received from a user terminal (not shown) to the other network device 130 through the network node 120.

The method 200 further includes configuring a first GTP tunnel 125 between the network node 120 and the computing unit 110 to receive the data flow via the first tunnel, and a second GTP tunnel 135 between the computing unit 110 and the other network device 130 to forward the data flow there-through, at S220. Then, a virtual switch 112 is configured in the computing unit 110 at S230. The virtual switch 112 has a first port 112a that is a terminal point for the first GTP tunnel 125 and a second port 112b that is a starting point for the second GTP tunnel 135 to forward the data flow there-between. The virtual switch 112 is also configured to supply the data to the virtual machine 114.

Figure 3:
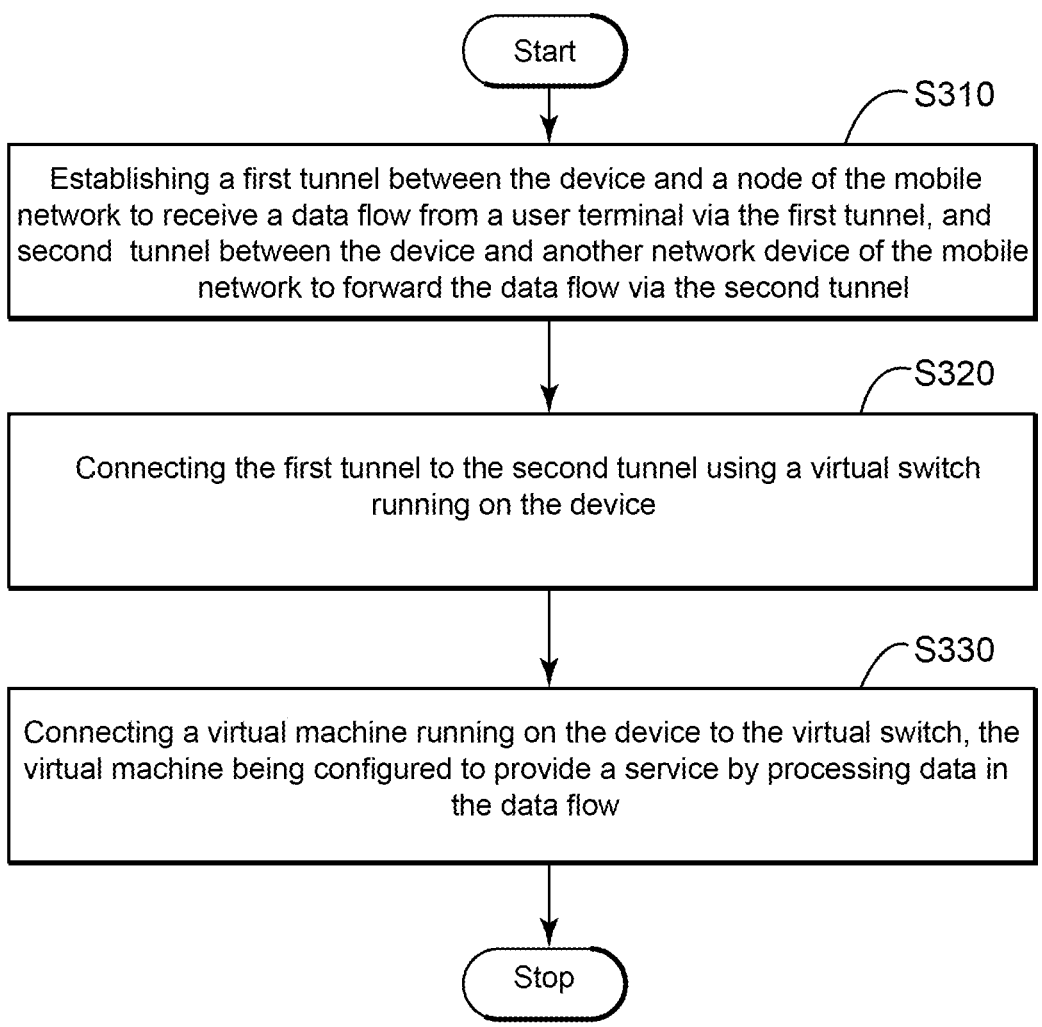
FIG. 3 is a flow diagram of a method according to another exemplary embodiment.

FIG. 3 is a flow diagram of a method 300 performed by a device (e.g., the computing unit 110) having one or more processors. The method 300 includes, at S310, establishing (A) a first tunnel between the device (e.g., 110) and a node (e.g., 120) of a mobile network to receive a data flow from a user terminal via the first tunnel, and (B) a second tunnel (e.g., 135) between the device and another network device (e.g., 130) of the mobile network to forward the data flow via the second tunnel. The first tunnel and the second tunnel operate according to Internet protocols (e.g., transmitting data packets between end points of the tunnel).

The method 300 further includes connecting the first tunnel to the second tunnel using a virtual switch (e.g., 112) running on the device, at S320, and connecting a virtual machine (e.g., 114) running on the device to the virtual switch, at S330. The virtual machine is configured to provide a service by processing data in the data flow.

The method 300 may further include breaking an existing tunnel between the node and the other device, wherein the breaking of the existing tunnel, the establishing of the first tunnel and the second channel and the connecting using the virtual switch trigger no change in the other device (i.e., it is transparent to the other device). Thus, the method 300 recites a method of upgrading a conventional system to operate according to an embodiment such that data is processed closer to the source of the data (i.e., the UE).

In method 300, the data flow may include GPRS packets and the Internet protocols may be included in the GPRS Tunneling Protocol (GTP). Further, the mobile network is an LTE system, the node is an eNodeB or a Radio Network Controller (RNC), and the other network device is a Serving Gateway (SGW), a Packet Data Network (PDN) Gateway (PDN-GW), a Service GPRS Support Node (SGSN) or a Gateway GPRS Support Node (GGSN).

The virtual switch 112 may be configured by a switch controller 140 to operate as a GTP tunnel end point. The switch controller 140 may connected to a device 150 operating as the Mobility Management Entity to receive the pertinent information. The switch controller 140 may be a module included in the computing unit 110 or in the device 150.

The virtual switch 112 has two ports: a first port 112a that operates as an end point of the first tunnel and a second port 112b that operates as a starting point of the second tunnel. The ports 112a and 112b exchange data via physical interface(s), for example, 117 and 118. The switch 112 may also exchange data with the virtual machine 114 via a virtual interface 115. A hypervisor 116 may also run on the computing unit 110 to enable running multiple operating systems.

The method 300 may also include configuring the virtual switch (e.g., 112) to forward the data flow from the first tunnel to the second tunnel, according to one or more predetermined traffic management rules. For example, in one embodiment, the virtual switch (e.g., 112) has another port 112c connected to Internet via another tunnel 127 to receive or transmit a traffic flow there-through. The predetermined traffic management rules make the forwarding the data flow from the first tunnel to the second tunnel to be performed together with at least one of breaking-out the data flow and breaking-in the data flow one or more traffic flows to or from Internet.

In another embodiment, the one or more predetermined traffic management rules include: (1) directing a first part of the data flow to a first network device and a second part of the data flow to a second network device, (2) attributing a higher priority to a third part of the data flow than a priority attributed to a fourth part of the data flow, and forwarding a fifth part of the data flow at a predetermined minimum speed. Here the first, second, third, fourth and fifth parts of the data flow are not necessarily disjoint from each other.

Figure 4:
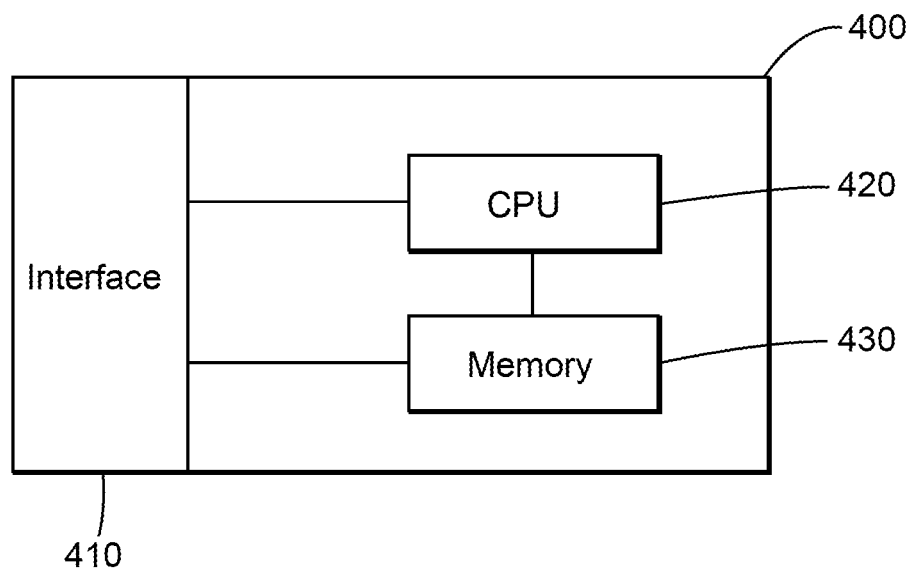
FIG. 4 is a schematic diagram of a computing unit according to an exemplary embodiment.

A schematic diagram of the structure of the computing unit according to an exemplary embodiment is illustrated in FIG. 4. The computing unit 400 includes at least one physical interface 410 configured to communicate with a node (e.g., 120) of a mobile network and another network device (e.g., 130) of the mobile network.

The computing unit 400 further includes a data processing unit 420 including one or more processors and configured to establish (A) a first tunnel (e.g., 125) between the computing unit and the node of the mobile network to enable a data flow from a user terminal via the first tunnel, and (B) a second tunnel (e.g., 135) between the computing unit and the other network device to forward the data flow. The first tunnel and the second tunnel may operate according to Internet protocols. The data processing unit 420 is further configured to run executable codes corresponding to a virtual switch (e.g., 112) connecting the first tunnel to the second tunnel, and to run executable codes corresponding to a virtual machine (e.g., 114) connected to the virtual switch, the virtual machine being configured to provide a service to the user terminal by processing data in the data flow.

The data flow passing through the computing unit 400 may include GPRS packets and the Internet protocols are included in GTP. Further, the mobile network may be an LTE system, the node may an eNodeB or an RNC and the other network device may be a gateway (SGW or PDN-GW) or a support node (e.g., SGNS or GGNS).

The computing unit 400 may further include a memory 430 configured to non-transitory store executable codes. The executable codes stored in the memory 430 may cause the CPU 420 and the interface 410 to perform a method similar to the method 200 or 300.

Figure 5:
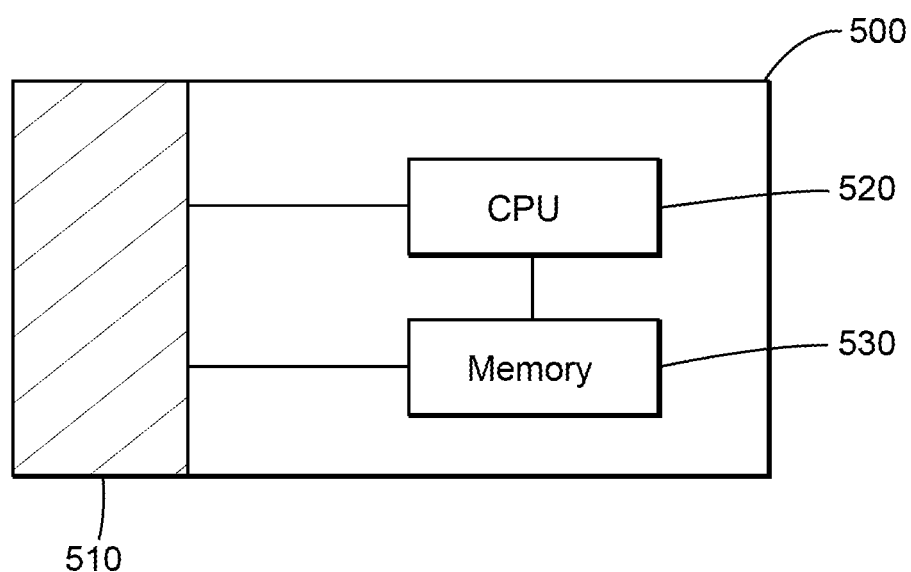
FIG. 5 is a schematic diagram of a network device according to another embodiment.

FIG. 5 is a schematic diagram of a device 500 in a mobile network according to another embodiment. The device 500 includes (A) a mobile network interface 510 configured to enable the device to communicate to a computing unit, and (B) a data processing unit 520. The data processing unit 520 is configured to provide information to a switch controller (e.g., 140) for configuring a virtual switch (e.g., 112) running on the computing unit to operate as a GTP tunnel end point. The data processing unit 520 is further configured to redirect a network node (e.g., 120) and another network device (e.g., 130) that have initially been connected via a GTP tunnel, to connect via a first GTP tunnel (e.g., 125) and a second GTP tunnel (e.g., 135) to the computing unit, respectively. Thus, the computing unit is enabled (A) to receive a data flow from a user terminal via the first tunnel, (B) to forward the data flow via the second tunnel, the first tunnel being connected to the second tunnel by the virtual switch, and (C) to connect a virtual machine running on the computing unit to the virtual switch. The virtual machine is configured to provide a service by processing data in the data flow. In one embodiment, the device 500 may be an MME modified to facilitate connecting tunnels channeling data flow from a user terminal and to a mobile network through a virtual switch in a network device which is configured to provide a service by processing data in the data flow.

An advantage of some of embodiments is that upon receiving a demand for data processing in the cloud, a transition from an existing GTP tunnel between two nodes (e.g., 120 and 130) to interposing a computing unit (e.g., 110) is transparent to the two nodes. In other words, the existing GTP tunnel is terminated, the computing unit is added to perform the on-demand data processing and the new first and second tunnels are established and connected via a virtual switch in the computing unit without the two nodes being aware of these changes.

The disclosed exemplary embodiments provide methods, devices and computer readable storage media to be used for providing a computing unit hosting a virtual machine and a virtual switch physically closer to a source of the data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A non-transitory computer readable medium storing executable codes which, when executed on a computer having a mobile network interface and one or more processors, make the computer perform a method comprising:
    establishing
        a first GTP tunnel between a device and a base station of a mobile network to receive a data flow from a user terminal via the first tunnel, and
        a second GTP tunnel between the device and another network node of the mobile network to forward the data flow,
        the first tunnel and the second tunnel operating according to GTP protocols;
    connecting the first GTP tunnel to the second GTP tunnel using a virtual switch running on the device; and
    configuring a virtual function running on the device to provide a service of processing data in the data flow received via the virtual switch in accordance with the application running in the virtual machine;
    wherein the virtual switch operates to forward the data flow from the first GTP tunnel to the second GTP tunnel, according to one or more predetermined traffic management rules.

2. The computer readable medium of claim 1, the method further comprising:
    breaking an existing GTP tunnel between the base station and the other network node, wherein the breaking of the existing tunnel GTP triggers no change in the other network node.

3. The computer readable medium of claim 1, wherein the virtual switch is connected to the Internet, and the method further comprises configuring the device to break-out one or more traffic flow from the data flow from the first GTP tunnel to the Internet.

4. A method performed by a mobile network node of a mobile communication network, the method comprising:
    establishing
        a first GTP tunnel between a device and a base station of a mobile network to receive a data flow from a user terminal via the first tunnel, and
        a second GTP tunnel between the device and another network node of the mobile network to forward the data flow,
        the first tunnel and the second tunnel operating according to GTP protocols;
    connecting the first GTP tunnel to the second GTP tunnel using a virtual switch running on the device; and
    configuring a virtual function running on the device to provide a service of processing data in the data flow received via the virtual switch in accordance with the application running in the virtual machine;
    wherein the virtual switch operates to forward the data flow from the first GTP tunnel to the second GTP tunnel, according to one or more predetermined traffic management rules.

5. The method of claim 4, the method further comprising:
    breaking an existing GTP tunnel between the base station and the other network node, wherein the breaking of the existing tunnel GTP triggers no change in the other network node.

6. The method of claim 4, wherein the virtual switch is connected to the Internet, and the method further comprises configuring the device to break-out one or more traffic flow from the data flow from the first GTP tunnel to the Internet.

7. A device in a mobile network, the device comprising:
    a mobile network interface configured to enable the device to communicate to a computing unit;
    a data processing unit configured
        to provide information to a switch controller for configuring a virtual switch running on the computing unit to operate as a General Packet Radio Service (GPRS) Tunneling Protocol (GTP) tunnel end point, and
        to redirect a network node and another network device that have initially been connected via a GTP tunnel, to connect via a first GTP tunnel and a second GTP tunnel to the computing unit, respectively,
    wherein the computing unit receives a data flow from a user terminal via the first GTP tunnel, forwards the data flow via the second GTP tunnel, the first GTP tunnel being connected to the second GTP tunnel by the virtual switch, and connects a virtual machine running on the computing unit to the virtual switch, the virtual machine being configured to provide a service by processing data in the data flow to support functionality of an application running in the virtual machine,
    wherein the virtual switch operates to forward the data flow from the first GTP tunnel to the second GTP tunnel, according to one or more predetermined traffic management rules.

* * * * *